(12) United States Patent
Date (10) Patent No.: US 9,309,933 B2
(45) Date of Patent: Apr. 12, 2016

(54) TRANSAXLE UNIT FOR HYBRID VEHICLE

(71) Applicant: MITSUBISHI JIDOSHA KOGYO KABUSHIKI KAISHA, Tokyo (JP)

(72) Inventor: Hiromasa Date, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 14/375,698

(22) PCT Filed: Jan. 30, 2013

(86) PCT No.: PCT/JP2013/051989
§ 371 (c)(1),
(2) Date: Jul. 30, 2014

(87) PCT Pub. No.: WO2013/129011
PCT Pub. Date: Sep. 6, 2013

(65) Prior Publication Data
US 2014/0374211 A1 Dec. 25, 2014

(30) Foreign Application Priority Data
Mar. 2, 2012 (JP) ................................. 2012-046532

(51) Int. Cl.
*B60K 6/40* (2007.10)
*F16D 25/12* (2006.01)
*B60K 6/387* (2007.10)
*B60K 6/442* (2007.10)
*F16D 25/02* (2006.01)
*B60K 6/48* (2007.10)

(52) U.S. Cl.
CPC ................ *F16D 25/12* (2013.01); *B60K 6/387* (2013.01); *B60K 6/40* (2013.01); *B60K 6/442* (2013.01); *B60K 2006/4808* (2013.01); *F16D 25/02* (2013.01); *Y02T 10/626* (2013.01); *Y02T 10/6234* (2013.01); *Y10S 903/951* (2013.01)

(58) Field of Classification Search
CPC ....................................................... F16D 25/02
See application file for complete search history.

(56) References Cited

U.S. PATENT DOCUMENTS

| | | | | |
|---|---|---|---|---|
| 4,924,989 A * | 5/1990 | Filderman | ............. | F16D 43/284 192/103 F |
| 6,575,865 B2 * | 6/2003 | Takenaka | ............... | B60K 6/383 180/65.235 |
| 6,656,083 B2 | 12/2003 | Esaki | | |

(Continued)

FOREIGN PATENT DOCUMENTS

| | | | |
|---|---|---|---|
| JP | 2000-127774 A | 5/2000 | |
| JP | 2000-326739 A | 11/2000 | |

(Continued)

*Primary Examiner* — Sherry Estremsky
(74) *Attorney, Agent, or Firm* — Birch, Stewart, Kolasch & Birch, LLP (57) ABSTRACT

A transaxle unit that separately transmits power from an engine and power from a motor to an output shaft of driving wheels and transmits the power from the engine to a generator is provided. A rotary shaft of the motor is disposed vertically apart from the output shaft, and a rotary shaft of the generator is disposed horizontally apart from the output shaft. A clutch is disposed in the transaxle unit in a power transmission path from the engine to the output shaft to connect or disconnect the power from the engine. A pump is disposed coaxially with a rotary shaft of the clutch on a side of the transaxle unit to generate hydraulic pressure for the clutch with the power from the output shaft.

9 Claims, 4 Drawing Sheets

(56) References Cited

U.S. PATENT DOCUMENTS

| | | | |
|---|---|---|---|
| 7,694,762 B2 * | 4/2010 | Supina | B60K 6/365 |
| | | | 180/65.25 |
| 7,845,444 B2 | 12/2010 | Kidokoro et al. | |
| 8,430,190 B2 | 4/2013 | Honda et al. | |
| 8,459,134 B2 * | 6/2013 | Harashima | F01C 17/02 |
| | | | 74/325 |
| 8,636,091 B2 * | 1/2014 | Sanji | B60K 6/26 |
| | | | 180/65.23 |
| 9,126,582 B2 * | 9/2015 | Nissato | B60W 20/10 |
| 2002/0084118 A1 | 7/2002 | Esaki | |
| 2008/0076616 A1 | 3/2008 | Kidokoro et al. | |
| 2011/0036652 A1 | 2/2011 | Honda et al. | |
| 2013/0281259 A1 * | 10/2013 | Larkin | B60K 6/387 |
| | | | 477/5 |

FOREIGN PATENT DOCUMENTS

| | | |
|---|---|---|
| JP | 2002-199506 A | 7/2002 |
| JP | 2003-307270 A | 10/2003 |
| JP | 2008-74267 A | 4/2008 |
| JP | 2010-76678 A | 4/2010 |
| JP | 2010-195338 A | 9/2010 |
| WO | WO 2009/128288 A1 | 10/2009 |

* cited by examiner

TRANSAXLE UNIT FOR HYBRID VEHICLE

FIELD

The present invention relates to a transaxle unit for a hybrid vehicle equipped with an engine, a generator, and a motor.

BACKGROUND

Hybrid vehicles have been well known that are driven by engines (internal combustion engines) and motors (electric motors) used in conjunction with each other. The proportion of power that each driving source of a hybrid vehicle distributes is variably controlled depending on the output characteristics of the installed engine and motor and the running states of the vehicle. For example, a vehicle equipped with a mild hybrid system can operate in different modes, such as an engine-only mode during which the vehicle runs solely on the engine depending on the running state of the vehicle, a power regeneration mode, and an assist mode during which the driving force generated at the motor is used to assist the driving force generated at the engine. A mild hybrid system adopts a motor which owns relatively low output performance and achieves superior fuel economy (fuel saving) compared to vehicles other than hybrid vehicles.

Vehicles taking a strong hybrid system have an additional motor-only mode during which the vehicle runs solely on the motor. That is, the motor is operated while the engine is shut down to run the vehicle fully on electricity. Strong hybrid vehicles achieve high fuel economy compared to mild hybrid vehicles but the installment of high-power motors and corresponding batteries are adopted.

Such hybrid vehicles taking multifunctional hybrid systems have powertrains with increasingly complicated structures. A hybrid vehicle is equipped with various devices to establish an energy path appropriate for the driving mode, such as a power generator, a motor, a transmission for varying the torque and rotational speed of the driving wheels, a clutch for switching the driving source, and a driving unit for driving the clutch.

Further reductions in size and weight of powertrain systems are essential for improvements in environmental adaptability and fuel economy of vehicles. In particular, the mountability of powertrains in vehicles taking a strong hybrid system tends to be low due to large motors and generators; thus, reductions in sizes of the powertrains are significantly important.

To solve such issues, an approach has been proposed for enhancing the mountability of a powertrain by aligning the motor and the generator along an axis. For example, PTL 1 (Patent Literature 1) describes a driving unit of a hybrid vehicle equipped with coaxially positioned motor and generator having a same outer diameter. Such an arrangement reduces the side shape (side surface area in appearance) of the powertrain and enhances the mountability.

CITATION LIST

Patent Literature

[PTL 1] WO2009-128288

SUMMARY

Technical Problems

The arrangement described above reduces the side shape but increases the protrusion along the axis. Thus, the mountability decreases depending on the structure of the vehicle and/or the positioning of the powertrain, contrary to the original intentions. An object of the present invention, which has been conceived in light of the issues described above, is to provide a transaxle unit for a hybrid vehicle that has high space efficiency and mountability.

In addition to the object described above, any other object of the present invention may be the achievement of advantages through the configuration of the embodiments of the present invention described below, which cannot be achieved by any known art.

Solution to Problems (1) According to the present invention, a transaxle unit of a powertrain for a hybrid vehicle equipped with an engine, a generator, and a motor, separately transmits power from the engine and power from the motor to an output shaft of driving wheels and transmits the power from the engine to the generator.

The powertrain includes a clutch disposed in a power transmission path from the engine to the output shaft in the transaxle unit, the clutch connecting or disconnecting the power from the engine. The powertrain includes a pump disposed coaxially with a rotary shaft of the clutch on a side of the transaxle unit, the pump generating hydraulic pressure for the clutch with the power from the output shaft. The generator has a rotary shaft disposed horizontally apart from the output shaft, and the motor has a rotary shaft disposed vertically apart from the output shaft.

The clutch is preferably installed in the transaxle at a position not interfering with the generator and the motor in side view. A position not interfering refers to a position that does not overlap (does not align) with the generator and the motor in side view of the transaxle. The generator and the motor are fixed to a side of the transaxle.

(2) A rotary shaft of the engine is preferably disposed parallel to the output shaft. In such a case, the motor preferably has a rotary shaft disposed above the output shaft, and the clutch preferably has a clutch shaft comprising a rotary shaft disposed below a plane in which an input shaft connected to the rotary shaft of the engine and the output shaft are coplanar.

It is preferable that, in a side view of the transaxle, a line segment connecting between the input shaft and the clutch shaft is not collinear with a line segment connecting between the clutch shaft and the output shaft. These line segments form a polygonal line that bends at the position of the clutch shaft.

(3) The generator preferably has a rotary shaft disposed below a horizontal plane extending through the rotary shaft of the engine.

(4) The engine is preferably disposed on one side in the vehicle-width direction of the transaxle unit, and the generator, the motor, and the pump are preferably disposed on another side in the vehicle-width direction.

(5) The transaxle unit preferably includes an output shaft, an input shaft, a motor shaft, a generator shaft, a clutch shaft, and a pump shaft. For example, the output shaft is disposed between a first mechanism for the power transmission from the engine to the driving wheels and a second mechanism for the power transmission from the motor to the driving wheels and outputs the power from the engine and the motor to the driving wheels. The input shaft is disposed between a third mechanism for the power transmission from the engine to the generator and the first mechanism and connected to the rotary shaft of the engine.

The motor shaft is connected to the rotary shaft of the motor and transmits the power from the motor to the second mechanism. The generator shaft is connected to the rotary shaft of the generator and transmits the power from the third mechanism to the generator. The clutch shaft functions as a rotary shaft of the clutch and is disposed in the first mechanism not so as to overlap with both the motor and the generator in the axial direction of the output shaft. The pump shaft is disposed coaxially with the clutch shaft, rotatable in cooperation with the output shaft, and connected to the pump generating hydraulic pressure for the clutch.

The generator shaft, the motor shaft, the clutch shaft, and the pump shaft are preferably disposed parallel to the input shaft and the output shaft. That is, the crank shaft of the engine, the rotary shaft of the generator, the rotary shaft of the motor, the rotary shaft of the clutch, the rotary shaft of the pump, and the output shaft are all parallel to each other.

Advantageous Effects

With the transaxle unit for a hybrid vehicle according to the present invention, the generator and the motor are disposed apart from each other in the vertical and horizontal directions around the output shaft to readily dispose the generator and the motor closer to each other along the horizontal direction. This configuration can reduce the overall dimensions of the powertrain.

The pump and the output shaft can be disposed in a space formed above or below the motor, whichever is closer to the generator, to densely dispose the pump, the generator, and the motor on a side of the transaxle and enhance space efficiency.

DESCRIPTION OF EMBODIMENTS

A transaxle unit of a hybrid vehicle will now be described with reference to the accompanying drawings. The embodiments described below are mere examples, and various modifications and technological applications that are not described in the embodiments are not to be excluded from the scope of the invention. The configurations of the embodiments may be modified in various ways within the scope of the invention and may be selected and/or be combined appropriately.

[1. Powertrain]

Figure 1:
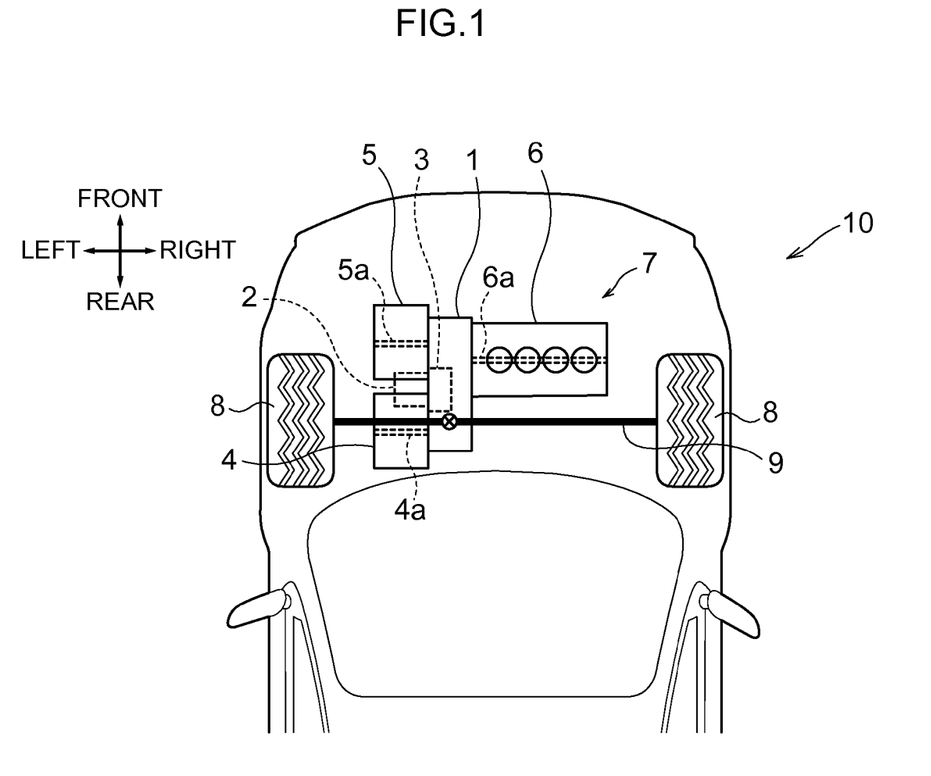
FIG. 1 is a top view of an example interior configuration of a vehicle equipped with a powertrain according to an embodiment.

A powertrain 7 according to this embodiment is installed in a vehicle 10 illustrated in FIG. 1. The vehicle 10 is a strong hybrid vehicle that has an engine 6 and a motor 4 as driving sources. The powertrain 7 includes an engine 6, a motor 4, a generator 5, a transaxle 1, a clutch 3, and a pump 2. The driving forces from the engine 6 and the motor 4 are transmitted to driving wheels 8 via the transaxle 1 to drive the vehicle 10. The vehicle 10 illustrated in FIG. 1 has a front-engine front-wheel-drive (FF) layout in which the front wheels are the driving wheels 8.

The engine 6 may be a gasoline or diesel engine that burns gasoline or diesel fuel, respectively. The engine 6, which is fixed to the right side of the transaxle 1, is transversely mounted such that the crank shaft 6a extends along the width of the vehicle 10 (in the vehicle-width direction). The crank shaft 6a is parallel to the drive shaft 9 of the driving wheels 8. The operating condition of the engine 6 is controlled by an electronic control unit (ECU) (not shown).

The motor 4 is, for example, a high-power permanent-magnet synchronous motor that receives the electrical power stored in an electrical storage device to rotate a rotor. The electrical power source of the motor 4 is a driving battery mounted on the vehicle 10. The driving battery is, for example, a lithium-ion battery or a nickel-metal hydride battery and supplies a high-voltage direct current (DC) of several hundred volts to the motor 4.

An inverter for converting (inverting) the DC from the driving battery to an alternating current (AC) is disposed beside or inside the motor 4. The rotational speed of the motor 4 is proportional to the AC frequency of the current converted at the inverter. Thus, the rotational speed of the motor 4 can be adjusted through control of the inverter. The external shape of a typical motor 4 corresponds to the shape of a rotary rotor. For example, the motor 4 is shaped into a cylinder having a longitudinal axis aligned with the rotational axis of the rotor and is fixed to the left side of the transaxle 1 such that its bottom faces the transaxle 1. The operating conditions of the motor 4 and the inverter are controlled with an electronic control unit (MCU, Motor Control Unit) (not shown).

The generator 5 functions as a starter of the engine 6 and a generator that generates electric power from the engine power supplied during the operation of the engine 6. The generator 5 can charge the driving battery as the power supply of the motor 4 and can supply power directly to the motor 4. The generator 5, for example, is shaped into a cylinder having a longitudinal axis aligned with the rotational axis and is fixed to the left side of the transaxle 1 such that its bottom faces the transaxle 1, like the motor 4.

The transaxle 1 is an integrated power transmission unit composed of a final drive, which includes a differential gear, and a transmission and accommodates multiple mechanisms associated with the transmission (reducer) of power between the driving sources and the driven devices. The transaxle 1 according to this embodiment principally has three power transmission paths.

[2. Power Transmission Paths]

Figure 2:
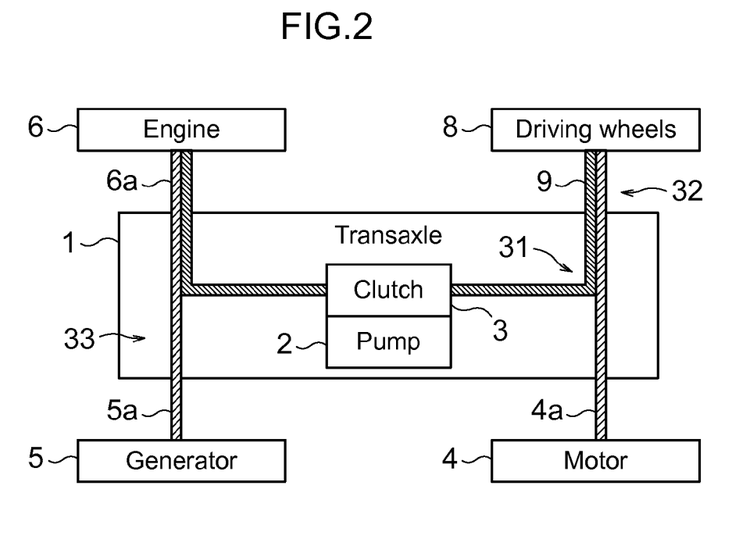
FIG. 2 is a schematic view of a power transmission path in a transaxle of the powertrain illustrated in FIG. 1.

FIG. 2 is a schematic view of the power transmission paths extending through the transaxle 1. The transaxle 1 has a first path 31 for the power transmission from the engine 6 to the driving wheels 8, a second path 32 for the power transmission from the motor 4 to the driving wheels 8, and a third path 33 for the power transmission from the engine 6 to the generator 5. The motor 4 and the engine 6 are connected to the driving wheels 8 in parallel via the transaxle 1. The generator 5 and the driving wheels 8 are connected to the engine 6 in parallel via the transaxle 1.

The first path 31 (first mechanism) is a power transmission path connecting the crank shaft 6a of the engine 6 and the drive shaft 9 and transmits power during the operation of the engine 6. The clutch 3 is disposed at a midway point in the first path 31 to connect or disconnect the power. The clutch 3 according to this embodiment is disposed in the transaxle 1. A transmission (not shown) may be disposed in the first path 31.

The clutch 3 is, for example, a multiple disk clutch, and connects or disconnects the power from the engine 6. The clutch 3 accommodates an engagement member 3a (driving member) that receives the driving force from the engine 6 and another engagement member 3b (driven member) that outputs the driving force to the driving wheels 8 (see FIG. 5). The engagement members 3a and 3b are activated to move close to or away from each other (for connection or disconnection, respectively) in accordance with the hydraulic pressure applied by the pump 2.

The pump 2 is a hydraulic pressure generator that sends pressurized hydraulic oil to a hydraulic circuit using the driving force applied toward the driving wheels 8 and is, for example, a gear pump, a vane pump, or a piston pump. The pump 2 is disposed adjacent to the clutch 3 on the left side of the transaxle 1. Specifically, the pump 2, e.g., a gear pump, a vane pump, or a piston pump, is disposed such that its rotary shaft is aligned with the rotary shaft of the clutch 3. The hydraulic pressure generated at the pump 2 moves the engagement members 3a and 3b of the clutch 3 toward each other. That is, the clutch 3 is engaged as a result of the generation of a hydraulic pressure at the pump 2 high enough to engage the engagement members 3a and 3b.

In this embodiment, the capacity of the pump 2 and the engagement characteristics of the engagement members 3a and 3b are determined so that the clutch 3 can be engaged by a hydraulic pressure generated at the pump 2 when the traveling speed of the vehicle 10 exceeds a certain speed. The engine 6 starts up when the clutch 3 is engaged, and the driving force from the engine 6 is transmitted to the driving wheels 8 through the first path 31. The clutch 3 is disengaged when the traveling speed of the vehicle 10 falls below a certain speed, and the engine 6 stops. That is, the engagement and disengagement of the clutch 3 are controlled in accordance with the running state of the vehicle 10. Thus, the driving source of the pump 2, which generates the hydraulic pressure applied to the clutch 3, is the driving wheels 8, not the engine 6.

The second path 32 (second mechanism) is a power transmission path connecting the rotary shaft 4a of the motor 4 and the drive shaft 9 and transmits the power from the motor 4. The motor 4 can operate in an assist mode in which the motor 4 assists the engine 6 to provide a driving force or an electric mode in which the vehicle 10 runs solely on electric power. The operating state of the motor 4 is controlled regardless of the engagement or disengagement of the clutch 3. For example, the vehicle 10 runs solely on the driving force of the motor 4 at the start of the vehicle 10 or during low-speed operation with the clutch 3 disengaged. While the vehicle 10 is running at a speed exceeding a certain speed, the driving force from the motor 4 is combined with the driving force of the engine 6 or the motor 4 is not turned on, depending on the running state of the vehicle 10.

The third path 33 (third mechanism) is a power transmission path connecting the crank shaft 6a of the engine 6 and the rotary shaft 5a of the generator 5 and undertakes power transmission for the start-up of the engine 6 and for the power-generation by the engine 6. The driving force from the driving wheels 8 enters the generator 5 via the third path 33 for conversion to electrical power, which is stored in a driving battery or a low-voltage battery.

[3. Transaxle]

Figure 3:
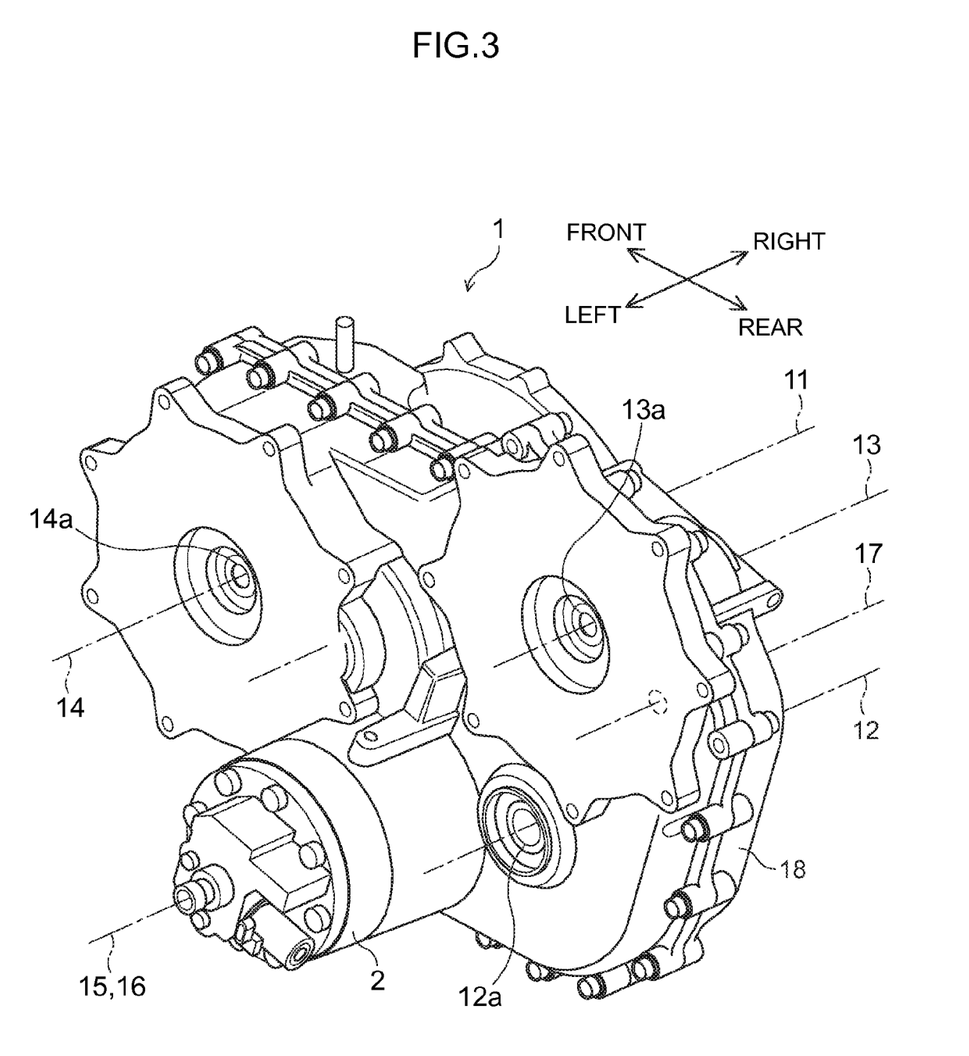
FIG. 3 is a perspective view of a transaxle of a powertrain illustrated in FIG. 1.

The exterior of the transaxle 1 (transaxle unit) having the three power transmission paths is illustrated in FIG. 3. FIG. 3 is a perspective view of the transaxle 1 connected to the pump 2. A casing 18 of the transaxle 1 has multiple flat cylinders consecutively installed and adjacent to each other in the radial direction, to conform with the shapes of multiple rotary shafts and gears disposed inside the transaxle 1. One side (the left side in FIG. 3) of the casing 18 has openings 13a, 14a, and 15a through which the rotary shaft 4a of the motor 4, the rotary shaft 5a of the generator 5, and the pump 2 respectively extend for connection. Another side of the casing 18 has an opening 11a through which the crank shaft 6a of the engine 6 extends for connection (refer to FIG. 5). An opening 12a extends through the both sides (the left side and the right side) of the casing 18 for the connection of the drive shaft 9.

The rotary shaft in the transaxle 1 that is connected to the crank shaft 6a is referred to as an input shaft 11. Similarly, the rotary shafts that are connected to the drive shaft 9, the rotary shaft 4a of the motor 4, and the rotary shaft 5a of the generator 5 are respectively referred to as an output shaft 12, a motor shaft 13, and a generator shaft 14. In the transaxle 1, the rotary shaft of the clutch 3 is referred to as a clutch shaft 15, the rotary shaft of the pump 2 is referred to as a pump shaft 16, and a shaft facing the output shaft 12 is referred to as a counter shaft 17.

Figure 4:
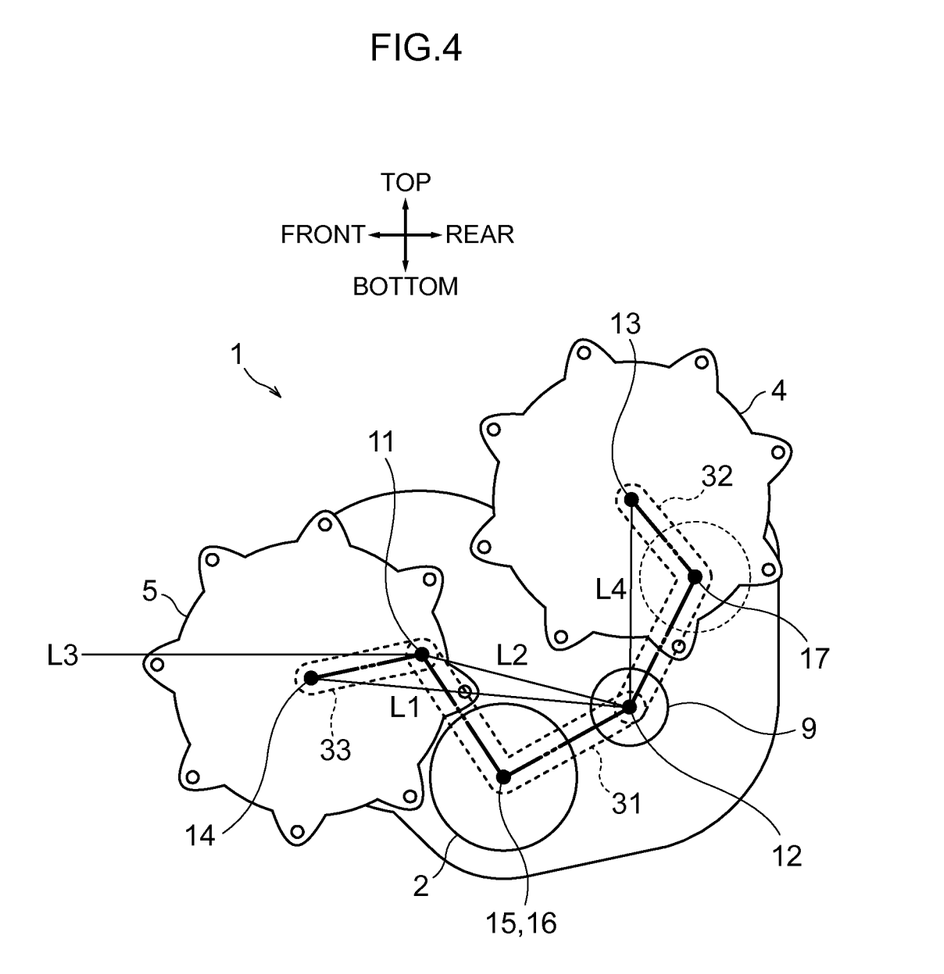
FIG. 4 is a side view of a power transmission path of a transaxle illustrated in FIG. 2.

FIG. 4 illustrates the positions of the rotary shafts in the transaxle 1. The clutch shaft 15 is coaxial to the pump shaft 16. The input shaft 11, the output shaft 12, the motor shaft 13, the generator shaft 14, the clutch shaft 15 and the counter shaft 17 are parallel to each other. The power transmission path from the input shaft 11 to the output shaft 12 corresponds to the first path 31. The second path 32 corresponds to the power transmission path from the motor shaft 13 to the output shaft 12. The third path 33 corresponds to the power transmission path from the input shaft 11 to the generator shaft 14.

The path from the generator shaft 14 to the motor shaft 13, which is indicated by the dash-double dot polygonal lines in FIG. 4, is accommodated in the transaxle 1. The motor 4 and the generator 5 are connected to the corresponding ends of the path, and the engine 6 and the drive shaft 9 of the driving wheels 8 are connected to a midway point of the path. The generator shaft 14 is disposed closer to the front of the vehicle than the output shaft 12, which is connected to the drive shaft 9, in the horizontal direction. The motor shaft 13 is disposed vertically above the output shaft 12. That is, the generator shaft 14 is disposed horizontally apart from the output shaft 12. Thus, the entire power transmission path forms an L shape with an apex at the output shaft 12.

The input shaft 11 and the clutch shaft 15 are disposed in the power transmission path from the output shaft 12 to the generator shaft 14. As illustrated in FIG. 4, the input shaft 11 is disposed above the straight line $L_1$ indicating a plane connecting between the generator shaft 14 and the output shaft 12. Meanwhile, the clutch shaft 15 is disposed below the straight line $L_2$ indicating a plane connecting between the input shaft 11 and the output shaft 12. The input shaft 11 and the output shaft 12 are coplanar in the plane. The clutch shaft 15 is located so as not to overlap with the motor 4 and the generator 5. For example, if the pump 2 has a cylindrical surface centered on the pump shaft 16, which is coaxial to the clutch shaft 15, the pump 2 should be positioned such that the cylindrical surface does not interfere with the motor 4 and the generator 5.

The path from the output shaft 12 to the generator shaft 14 forms a zigzag, which reduces the dimensions in the antero-posterior direction (front-back direction) of the vehicle. Similarly, the generator shaft 14 is disposed below the straight line $L_3$ indicating a horizontal plane extending through the input shaft 11. If the distance between the generator shaft 14 and the input shaft 11 is constant, the forward protrusion of the generator 5 in top view of the vehicle is reduced when the generator shaft 14 moves downward.

The counter shaft 17 is disposed in the power transmission path from the output shaft 12 to the motor shaft 13. The counter shaft 17 is disposed behind the straight line $L_4$ indicating a plane connecting the output shaft 12 and the motor shaft 13. As a result, the path from the output shaft 12 to the motor shaft 13 is shaped into an oblique L with an apex protruding rearward, and the distance of the path is reduced in the vertical direction.

[4. Skeleton Diagram]

Figure 5:
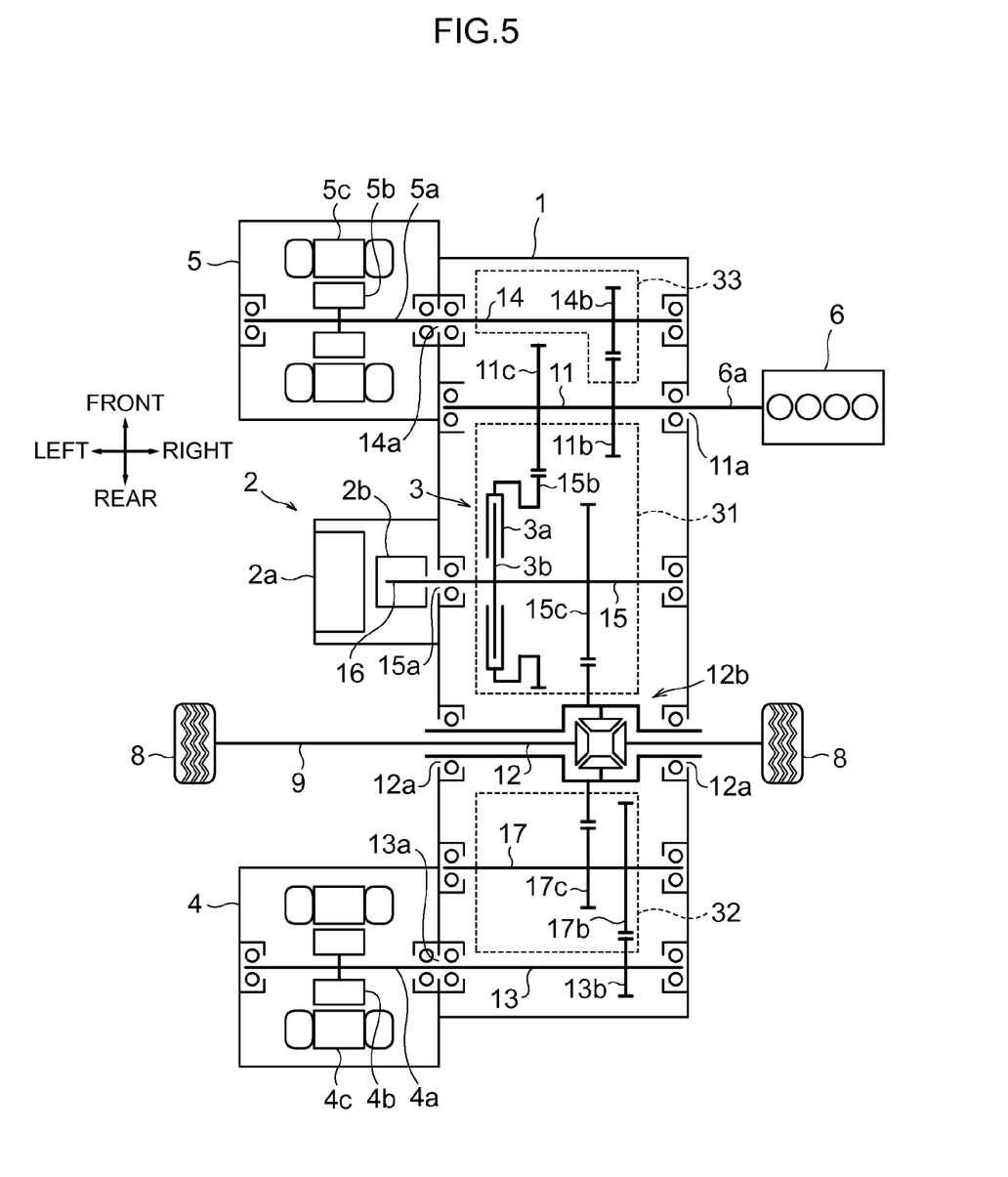
FIG. 5 illustrates an outline of a powertrain illustrated in FIG. 1.

FIG. 5 is a skeleton diagram of the transaxle 1 in which mechanical components associated with transmission are not depicted.

The input shaft 11 has two gears 11b and 11c. The gear 11b meshes with a gear 14b that is fixed to the generator shaft 14 to transmit power to the generator shaft 14. The generator shaft 14 is coaxially connected to (aligned with) the rotary shaft 5a, which is connected to a rotor 5b of the generator 5. A stator 5c of the generator 5 is fixed to the casing of the generator 5.

The gear 11c fixed to the input shaft 11 meshes with a gear 15b, which is connected to the engagement member 3a (driving member) of the clutch 3 that receives the driving force. The engagement member 3b (driven member), opposite to the engagement member 3a, is fixed to the clutch shaft 15 to be driven. A gear 15c that transmits power to the output shaft 12 is also disposed on the clutch shaft 15. The gear 15c meshes with a differential gear 12b, which is installed at the output shaft 12.

One end of the clutch shaft 15 is coaxially connected to the pump shaft 16 of a rotator 2a in the pump 2. The rotator 2a is a rotor in a bane pump or a piston in a piston pump. The rotator 2a receives a rotational driving force from the clutch shaft 15 to generate hydraulic pressure and sends the pressurized hydraulic oil to a hydraulic circuit 2b. The generated hydraulic pressure is transmitted to the clutch 3 to be used as a driving pressure for the engagement members 3a and 3b.

The motor shaft 13 has a gear 13b, and the counter shaft 17 has two gears 17b and 17c. The gear 13b of the motor shaft 13 meshes with the gear 17b of the counter shaft 17. The other gear 17c of the counter shaft 17 meshes with the differential gear 12b installed at the output shaft 12. The motor shaft 13 is coaxially connected to the rotary shaft 4a connected to the rotor 4b of the motor 4. The stator 4c of the motor 4 is fixed to the casing of the motor 4.

As described above, the input shaft 11 of the transaxle 1 supplies power from the engine 6 to two systems, i.e., the driving wheels 8 and the generator 5. The input shaft 11 is disposed between the two systems, which is to say, between the power transmission mechanism for power generation and the power transmission mechanism for driving. In other words, the input shaft 11 is disposed at the branching point of the first path 31 and the third path 33.

The output shaft 12 receives power separately from two systems, i.e., the engine 6 and the motor 4, and transmits the received power to the driving wheels 8. The output shaft 12 is disposed between the power transmission path for driving by the engine and the power transmission path for driving by the motor. In other words, the output shaft 12 is disposed at the merging point of the first path 31 and the second path 32.

[5. Operation and Advantageous Effects]

In the powertrain 7, one of the power transmission paths branching from the input shaft 11 in the transaxle 1 merges at the output shaft 12 to form a continuous or traversable path from the generator shaft 14 to the motor shaft 13 through the input shaft 11 and the output shaft 12. The continuous path is a unicursal line connecting between the generator shaft 14 and the motor shaft 13. Thus, as illustrated in FIG. 4, the path can be readily redirected in any direction at the shafts or bending points without affecting the power transmission ability. As a result, the positions of the components fixed to the transaxle 1, such as the pump 2, the motor 4, the generator 5, and the engine 6, can be designed with relatively high flexibility.

(1) In addition to the highly flexible power transmission structure, the motor 4 and the generator 5 in the transaxle 1 are disposed apart from each other in the vertical and horizontal directions around the output shaft 12. In this way, the motor 4 and the generator 5 can be readily disposed closer to each other in the horizontal direction to reduce the overall dimensions of the transaxle 1. This configuration can improve the space efficiency and can be readily mounted.

As illustrated in FIG. 4, the height of the motor 4 in side view differs from the height of the generator 5, i.e., the motor 4 is disposed diagonal to the generator 5. Thus, a space is formed below the motor 4, for example, and the pump 2 and the output shaft 12 can be disposed in this space. The pump 2, the motor 4, and the generator 5 can be disposed densely without interference with the drive shaft 9 on a side of the transaxle 1 to enhance the space efficiency. As a result, the overall dimensions of the powertrain 7 can be reduced.

For example, even if a pump 2, a motor 4, and a generator 5 are disposed based on the approach described in PTL 1 such that they overlap in side view, the width of the vehicle will increase. In contrast, in the transaxle 1 described above, the protrusion of the pump 2 from the left side of the transaxle 1 in the width direction of the vehicle can be reduced. Therefore, both of the length in the front-back direction and the width in right-left direction of the transaxle 1 can be reduced.

The pump 2, the motor 4, and the generator 5 do not overlap with the transaxle 1 in side view, and thus the accessibility is enhanced. The motor 4, the generator 5, and the pump 2 can be removed without disassembling the transaxle 1, and thus maintainability is enhanced.

(2) As illustrated in FIG. 4, the clutch shaft 15, which is the rotational center of the clutch 3, is disposed below the straight line $L_2$, in the transaxle 1. This configuration can reduce the distance between the input shaft 11 and the output shaft 12 in the horizontal and anteroposterior directions. As a result, the dimensions of the transaxle 1 in the anteroposterior direction can be reduced and the transaxle 1 can be made compact.

Regarding shape of the path between the input shaft 11 and the output shaft 12, the distance between the input shaft 11 and the output shaft 12 may be reduced in the horizontal and anteroposterior directions by disposing the clutch shaft 15 above the straight line $L_2$ (forming a polygonal line protruding upward). In such a case, however, the engine 6 connected to the input shaft 11, which is larger than the clutch 3 fixed to the clutch shaft 15, may increase the protrusion of the transaxle 1 toward the lower side of the vehicle. In contrast, a relatively small clutch 3 can be disposed below the straight line $L_2$ so as to be substantially flush with the lower side of the transaxle 1. This disposition can enhance the mountability.

(3) The generator shaft 14, which is the rotational center of the generator 5, is disposed below the straight line $L_3$ in the transaxle 1 to reduce the distance between the generator 5 and the crank shaft 6a of the engine 6 in top view. As a result, the dimensions of the transaxle 1 in the horizontal direction can be reduced even more. Similarly, the input shaft 11 in the transaxle 1 disposed above the straight line $L_1$ can reduce the distance between the generator 5 and the drive shaft 9 in top view. As a result, the dimensions of the transaxle 1 in the horizontal direction can be reduced even more.

(4) As illustrated in FIG. 1, only the engine 6 is disposed on the right side of the transaxle 1, and the pump 2, the motor 4, and the generator 5 are disposed on the left side. Thus, the dimensions and capacity of the engine 6 can be selected independently from the limits posed by the layout and dimensions of the pump 2, the motor 4, and the generator 5. That is, the engine 6 to be installed in the powertrain 7 can be selected from a wider range of dimensions while the thermal effect of the pump 2, the motor 4, and the generator 5 can be suppressed.

The non-overlapping arrangement of the pump 2, the motor 4, and the generator 5 on the left side of the vehicle 10 enhances the external accessibility of the vehicle 10. The motor 4, the generator 5, and the pump 2 can be removed without dissemble of the transaxle 1, resulting in high maintenance performance.

(5) As illustrated in FIG. 4, the shafts in the transaxle 1 are appropriately positioned to reduce the dimensions of the transaxle 1 of the powertrain 7. This is a rational approach to enhance the space efficiency of the powertrain 7 that can reduce the overall dimensions of the assembly and can effectively transmit the power.

[6. Modification]

In the embodiment as illustrated in FIG. 4, the generator shaft 14 is disposed horizontally in front of the output shaft 12, and the motor shaft 13 is disposed vertically above the output shaft 12. The generator shaft 14 and the motor shaft 13 to the output shaft may have any other relative position. The spaces above and below the drive shaft 9 are limited in the vertical direction and, in a strong hybrid vehicle, the motor 4 is preferably disposed near the drive shaft 9. Thus, it is preferred that the motor 4 be disposed vertically apart from the output shaft 12.

Thus, the generator 5 is preferably disposed horizontally apart from the output shaft 12. If the motor 4 and the generator 5 are not aligned in the horizontal and/or vertical directions, a space can be formed above or below the motor 4. This space can be used to install the drive shaft 9 and the pump 2.

In the embodiment described above, the input shaft 11, the output shaft 12, the motor shaft 13, the generator shaft 14, the clutch shaft 15, and the counter shaft 17 in the transaxle 1 are all parallel to each other. The shafts may have any arrangement other than the parallel arrangement. Thus, a universal joint that changes the direction of a rotary shaft may be disposed in the power transmission path or the extending direction of a shaft may be tilted with a gear shaft, for example, a bevel gear or a skew gear.

The power transmission path in the transaxle 1 can have any shape other than the shape indicated by the dash-double dot lines in FIG. 4. For example, the generator shaft 14 may be disposed above the straight line $L_3$, or the input shaft 11 may be disposed below the straight line $L_1$. If at least part of the power transmission path has a zigzag shape, the dimensions of the transaxle 1 can be reduced while the intended performance of the vehicle 10 is maintained.

[7. Additional Statements]

The following statements are additional disclosure on the embodiments and modifications described above.

(Additional Statement A-1)

A powertrain of a hybrid vehicle equipped with an engine, a generator, and a motor, the powertrain comprising:

a transaxle that separately transmits power from the engine and power from the motor to an output shaft of driving wheels and transmits the power from the engine to the generator;

a clutch disposed in a power transmission path from the engine to the output shaft in the transaxle, the clutch connecting or disconnecting the power from the engine; and a pump disposed coaxially with a rotary shaft of the clutch on a side of the transaxle, the pump generating hydraulic pressure for the clutch with the power from the output shaft, wherein, the generator has a rotary shaft disposed horizontally apart from the output shaft, and the motor has a rotary shaft disposed vertically apart from the output shaft.

(Additional Statement A-2)

The powertrain according to Additional Statement A-1, wherein, a rotary shaft of the engine is disposed parallel to the output shaft, the motor has a rotary shaft disposed above the output shaft, and the clutch has a clutch shaft comprising a rotary shaft disposed below a plane in which an input shaft connected to the rotary shaft of the engine and the output shaft are coplanar.

(Additional Statement A-3)

The powertrain according to Additional Statement A-1 or A-2, wherein the generator has a rotary shaft disposed below a horizontal plane extending through the rotary shaft of the engine.

(Additional Statement A-4)

The powertrain according to one of Additional Statements A-1 to A-3, wherein, the engine is disposed on one of the sides in the vehicle-width direction of the transaxle, and the generator, the motor, and the pump are disposed on the other side along the vehicle-width direction.

(Additional Statement A-5)

The powertrain according to one of Additional Statements A-1 to A-4, wherein the transaxle comprises:

an output shaft disposed between a first mechanism for the power transmission from the engine to the driving wheels and a second mechanism for the power transmission from the motor to the driving wheels, the output shaft outputting the power from the engine and the motor to the driving wheels;

an input shaft disposed between a third mechanism for the power transmission from the engine to the generator and the first mechanism, the input shaft connected to the rotary shaft of the engine;

a motor shaft that is connected to the rotary shaft of the motor, the motor shaft transmitting the power from the motor to the second mechanism;

a generator shaft that is connected to the rotary shaft of the generator, the generator shaft transmitting the power from the third mechanism to the generator;

a clutch shaft functioning as a rotary shaft of the clutch, the clutch shaft being disposed in the first mechanism not so as to overlap with both the motor and the generator in the axial direction of the output shaft; and a pump shaft disposed coaxially with the clutch shaft, rotatable in cooperation with the output shaft, and connected to the pump generating hydraulic pressure for the clutch.

(Additional Statement B-1)

A transaxle unit for a hybrid vehicle that is connected to an engine and motor in series with driving wheels, the transaxle unit comprising:

a generator that generates power with the power from the engine;

an output shaft that outputs the power from the engine and the motor to the driving wheels;

an input shaft connected to a rotary shaft of the engine;

a motor shaft disposed vertically apart from the output shaft and connected to a rotary shaft of the motor;

a generator shaft disposed horizontally apart from the output shaft and connected to the rotary shaft of the generator;

a clutch shaft functioning as a rotary shaft of the clutch, the clutch shaft being disposed in the power transmission path from the engine to the driving wheels not so as to overlap with both the motor and the generator in the axial direction of the output shaft; and a pump shaft disposed coaxially with the clutch shaft, rotatable in cooperation with the output shaft, and connected to a pump is generating hydraulic pressure for the clutch.

(Additional Statement B-2)

The transaxle unit for a hybrid vehicle according to Additional Statement B-1, wherein,
the input shaft is disposed parallel to the output shaft,
the motor shaft is disposed above the output shaft, and
the clutch shaft is disposed below a plane connecting the input shaft and the output shaft.

(Additional Statement B-3)

The transaxle unit for a hybrid vehicle according to Additional Statement B-1 or B-2, wherein
the generator shaft is disposed below a horizontal plane extending through the input shaft.

(Additional Statement B-4)

The transaxle unit for a hybrid vehicle according to one of Additional Statements B-1 to B-3, wherein,
an end of the input shaft on a first side in the vehicle-width direction is connected to the engine, and
an end of the generator shaft, an end of the motor shaft, and an end of the pump shaft on a second side in the vehicle-width direction are respectively connected to the generator, the motor, and the pump.

(Additional Statement B-5)

The transaxle unit for a hybrid vehicle according to one of Additional Statements B-1 to B-4, wherein,
the output shaft is disposed between a first mechanism for the power transmission from the engine to the driving wheels and a second mechanism for the power transmission from the motor to the driving wheels,
the input shaft is disposed between a third mechanism for the power transmission from the engine to the generator and the first mechanism, the input shaft transmitting the power from the motor to the second mechanism, and
the generator shaft transmits the power from the third mechanism to the generator.

REFERENCE SIGNS LIST 1 transaxle (transaxle unit)
11 input shaft
12 output shaft
13 motor shaft
14 generator shaft
15 clutch shaft
16 pump shaft
17 counter shaft
2 pump
3 clutch
4 motor
5 generator
6 engine
7 powertrain
8 driving wheels
9 drive shaft

The invention claimed is:

1. A transaxle unit of a powertrain for a hybrid vehicle equipped with an engine, a generator, and a motor, the transaxle unit separately transmitting power from the engine and power from the motor to an output shaft of driving wheels and transmitting the power from the engine to the generator, the powertrain comprising:

a clutch disposed in a power transmission path from the engine to the output shaft in the transaxle unit, the clutch connecting or disconnecting the power from the engine; and a pump disposed coaxially with a rotary shaft of the clutch on a side of the transaxle unit, the pump generating hydraulic pressure for the clutch with the power from the output shaft, wherein
the generator has a rotary shaft disposed horizontally apart from the output shaft, and
the motor has a rotary shaft disposed vertically apart from the output shaft.

2. The transaxle unit for a hybrid vehicle according to claim 1, wherein,
a rotary shaft of the engine is disposed parallel to the output shaft,
the motor has a rotary shaft disposed above the output shaft, and
the clutch has a clutch shaft comprising a rotary shaft disposed below a plane in which an input shaft connected to the rotary shaft of the engine and the output shaft are coplanar.

3. The transaxle unit for a hybrid vehicle according to claim 2, wherein the generator has a rotary shaft disposed below a horizontal plane extending through the rotary shaft of the engine.

4. The transaxle unit for a hybrid vehicle according to claim 3, wherein,
the engine is disposed on one of the sides in the vehicle-width direction of the transaxle unit, and
the generator, the motor, and the pump are disposed on the other side in the vehicle-width direction.

5. The transaxle unit for a hybrid vehicle according to claim 2, wherein,
the engine is disposed on one of the sides in the vehicle-width direction of the transaxle unit, and
the generator, the motor, and the pump are disposed on the other side in the vehicle-width direction.

6. The transaxle unit for a hybrid vehicle according to claim 1, wherein the generator has a rotary shaft disposed below a horizontal plane extending through the rotary shaft of the engine.

7. The transaxle unit for a hybrid vehicle according to claim 6, wherein,
the engine is disposed on one of the sides in the vehicle-width direction of the transaxle unit, and
the generator, the motor, and the pump are disposed on the other side in the vehicle-width direction.

8. The transaxle unit for a hybrid vehicle according to claim 1, wherein,
the engine is disposed on one of the sides in the vehicle-width direction of the transaxle unit, and
the generator, the motor, and the pump are disposed on the other side in the vehicle-width direction.

9. The transaxle unit for a hybrid vehicle according to claim 1, wherein the transaxle unit comprises:
an output shaft disposed between a first mechanism for the power transmission from the engine to the driving wheels and a second mechanism for the power transmission from the motor to the driving wheels, the output shaft outputting the power from the engine and the motor to the driving wheels;
an input shaft disposed between a third mechanism for the power transmission from the engine to the generator and the first mechanism, the input shaft being connected to the rotary shaft of the engine;

a motor shaft connected to the rotary shaft of the motor, the motor shaft transmitting the power from the motor to the second mechanism;

a generator shaft connected to the rotary shaft of the generator, the generator shaft transmitting the power from the third mechanism to the generator;

a clutch shaft functioning as a rotary shaft of the clutch, the clutch shaft being disposed in the first mechanism not so as to overlap with both the motor and the generator in the axial direction of the output shaft; and a pump shaft disposed coaxially with the clutch shaft, rotatable in cooperation with the output shaft, and connected to the pump generating hydraulic pressure for the clutch.

* * * * *